United States Patent
Huang et al.

(10) Patent No.: US 11,644,653 B2
(45) Date of Patent: May 9, 2023

(54) OPTICAL IMAGING LENS ASSEMBLY AND ELECTRONIC DEVICE

(71) Applicant: Zhejiang Sunny Optical Co., Ltd, Zhejiang Province (CN)

(72) Inventors: Lin Huang, Zhejiang Province (CN); Fujian Dai, Zhejiang Province (CN); Liefeng Zhao, Zhejiang Province (CN)

(73) Assignee: Zhejiang Sunny Optical Co., Ltd, Zhejiang Province (CN)

( * ) Notice: Subject to any disclaimer, the term of this patent is extended or adjusted under 35 U.S.C. 154(b) by 338 days.

(21) Appl. No.: 16/884,556

(22) Filed: May 27, 2020

(65) Prior Publication Data

US 2020/0393656 A1  Dec. 17, 2020

(30) Foreign Application Priority Data

Jun. 13, 2019 (CN) .......................... 201910509276.5

(51) Int. Cl.
  *G02B 9/60* (2006.01)
  *G02B 13/02* (2006.01)
  *G02B 13/00* (2006.01)

(52) U.S. Cl.
  CPC .......... *G02B 13/0045* (2013.01); *G02B 9/60* (2013.01); *G02B 13/02* (2013.01)

(58) Field of Classification Search
  USPC .................................................. 359/745, 746
  See application file for complete search history.

(56) References Cited

U.S. PATENT DOCUMENTS

| | | | | |
|---|---|---|---|---|
| 4,204,747 | A | * | 5/1980 | Imai ........................ G02B 13/02 359/764 |
| 4,747,982 | A | | 5/1988 | Nakatsukasa et al. |
| 2010/0053774 | A1 | * | 3/2010 | Baba ........................ G02B 13/16 359/755 |

* cited by examiner

*Primary Examiner* — Darryl J Collins
(74) *Attorney, Agent, or Firm* — Norris McLaughlin, P.A.

(57) ABSTRACT

The present disclosure discloses an optical imaging lens assembly and an electronic device. The optical imaging lens assembly includes, sequentially from an object side to an image side along an optical axis, a first lens, a second lens, a third lens and at least two subsequent lenses. A distance TTL along the optical axis from an object-side surface of the first lens to an imaging plane of the optical imaging lens assembly and a total effective focal length f of the optical imaging lens assembly satisfy TTL/f<1. An optical part of at least one of the lenses included in the optical imaging lens assembly is trimmed in a Y-axis direction, and a maximum effective radius DY along the Y-axis of the trimmed lens and a maximum effective radius DX along a X-axis of the trimmed lens satisfy 0.5<DY/DX<1.0, wherein the X-axis is perpendicular to the Y-axis.

17 Claims, 6 Drawing Sheets

OPTICAL IMAGING LENS ASSEMBLY AND ELECTRONIC DEVICE

CROSS-REFERENCE TO RELATED APPLICATION

This application claims benefit of priority to Chinese Patent Application No. 201910509276.5 filed on Jun. 13, 2019 before the China National Intellectual Property Administration, the entire disclosure of which is incorporated herein by reference in its entity.

TECHNICAL FIELD

The embodiments of the present disclosure relate to the field of optical elements, and specifically to an optical imaging lens assembly and an electronic device.

BACKGROUND

Generally, an ultra-telephoto optical imaging lens assembly needs to obtain sufficient luminous flux (i.e., large aperture) due to its long focal length. Therefore, not only the total length TTL of the lens assembly will become longer, but also the entrance pupil diameter will become larger. In this case, the height of the lens assembly is increased. Even if the lens uses a prism to change the direction of light to reduce the height, the size of the lens assembly in the Y-axis direction will still be relatively large, making it difficult to meet the height limitation requirements of the lens module.

SUMMARY

To address the technical problems in the prior art, the present disclosure provides an optical imaging lens assembly and an electronic device.

According to an aspect of the present disclosure, an optical imaging lens assembly is provided, the optical imaging lens assembly includes, sequentially from an object side to an image side along an optical axis: a first lens, having a refractive power; a second lens, having a refractive power; a third lens, having a refractive power; and at least two subsequent lenses having refractive powers, wherein a distance TTL along the optical axis from an object-side surface of the first lens to an imaging plane of the optical imaging lens assembly and a total effective focal length f of the optical imaging lens assembly satisfy TTL/f<1, and wherein an optical part of at least one of the lenses included in the optical imaging lens assembly is trimmed in a direction of a Y-axis, and a maximum effective radius DY along the Y-axis of the trimmed lens and a maximum effective radius DX along a X-axis of the trimmed lens satisfy 0.5<DY/DX<1.0, wherein the X-axis is perpendicular to the Y-axis.

According to an implementation of the present disclosure, an optical part of the first lens is trimmed in the direction of the Y-axis, and a maximum effective radius DT11Y along the Y-axis of the object-side surface of the first lens and a maximum effective radius DT11X along the X-axis of the object-side surface of the first lens satisfy: 0.5<DT11Y/DT11X<1.0.

According to an implementation of the present disclosure, a maximum effective radius DT12Y along the Y-axis of an image-side surface of the first lens and a maximum effective radius DT12X along the X-axis of the image-side surface of the first lens satisfy: 0.5<DT12Y/DT12X≤1.0.

According to an implementation of the present disclosure, a maximum effective radius DT21Y along the Y-axis of an object-side surface of the second lens and a maximum effective radius DT21X along the X-axis of the object-side surface of the second lens satisfy: 0.5<DT21Y/DT21X≤1.0.

According to an implementation of the present disclosure, a maximum effective radius DT22Y along the Y-axis of an image-side surface of the second lens and a maximum effective radius DT22X along the X-axis of the image-side surface of the second lens satisfy: 0.5<DT22Y/DT22X≤1.0.

According to an implementation of the present disclosure, a radius of curvature R1 of the object-side surface of the first lens and an effective focal length f1 of the first lens satisfy: 0.2<R1/f1<1.0.

According to an implementation of the present disclosure, a radius of curvature R5 of an object-side surface of the third lens, a radius of curvature R6 of an image-side surface of the third lens and a total effective focal length f of the optical imaging lens assembly satisfy: 0.3<(R5+R6)/f<0.8.

According to an implementation of the present disclosure, a total focal length f of the optical imaging lens assembly and a combined focal length f23 of the second lens and the third lens satisfy: 0.5<f/f23<1.5.

According to an implementation of the present disclosure, a radius of curvature R3 of an object-side surface of the second lens and a radius of curvature R4 of an image-side surface of the second lens satisfy: 0.2<(R3+R4)/(R3−R4)<1.3.

According to an implementation of the present disclosure, the at least two subsequent lenses include a fourth lens at an image side of the third lens and a fifth lens at an image side of the fourth lens, and an air gap T12 along the optical axis between the first lens and the second lens, an air gap T23 along the optical axis between the second lens and the third lens, an air gap T34 along the optical axis between the third lens and the fourth lens and an air gap T45 along the optical axis between the fourth lens and the fifth lens satisfy: 0.1<(T12+T23)/(T34+T45)<0.6.

According to an implementation of the present disclosure, the at least two subsequent lenses include a fourth lens at an image side of the third lens and a fifth lens at an image side of the fourth lens, and a center thickness CT3 along the optical axis of the third lens, a center thickness CT4 along the optical axis of the fourth lens, and a center thickness CT5 along the optical axis of the fifth lens satisfy: 0.2<CT5/(CT3+CT4)<0.7.

According to an implementation of the present disclosure, a projection distance SAG31 along the optical axis from an intersection of an object-side surface of the third lens and the optical axis to an effective radius vertex of the object-side surface of the third lens, and a projection distance SAG32 along the optical axis from an intersection of an image-side surface of the third lens and the optical axis to an effective radius vertex of the image-side surface of the third lens satisfy: 0.3<SAG32/SAG31<0.8.

According to an implementation of the present disclosure, half of a maximal field-of-view angle of the optical imaging lens assembly is smaller than 25°.

According to an implementation of the present disclosure, the refractive power of the first lens is a positive refractive power, and the object-side surface of the first lens is a convex surface.

According to an implementation of the present disclosure, the refractive power of the second lens is a negative refractive power, and an image-side surface of the second lens is a concave surface.

According to an implementation of the present disclosure, an object-side surface of the third lens is a convex surface, and an image-side surface of the third lens is a concave surface.

According to an implementation of the present disclosure, a refractive power of the fourth lens is a positive refractive power.

According to an aspect of the present disclosure, an electronic device is provided, and the electronic device includes optical imaging lens assembly described above.

The optical imaging lens assembly provided in the present disclosure employs a trimming process in a Y-axis direction on an optical part of at least one lens of the lens assembly, so as to effectively reduce the overall height of the lens along the Y-axis, and ensure that the lens assembly has a small enough size with a large aperture, and thus the optical imaging lens assembly has the characteristics of miniaturization.

BRIEF DESCRIPTION OF THE DRAWINGS

Other features, purpose and advantages of the present disclosure will become apparent through detailed description of the non-limiting implementations given in conjunction with the accompanying drawings. In the drawings.

DETAILED DESCRIPTION OF EMBODIMENTS

Figure 1:
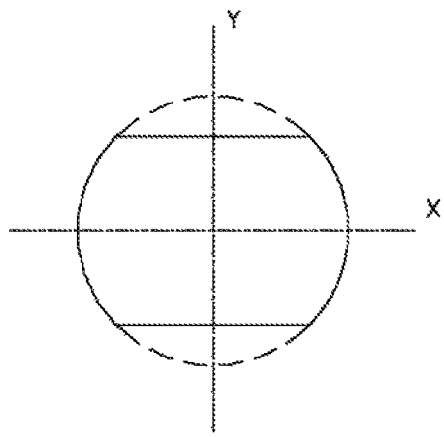
FIG. 1 is schematic view of a trimming process performed along the Y-axis for an optical imaging lens assembly according to an embodiment of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. The surface of each lens closest to the object side is referred to as an object-side surface, and the surface of each lens closest to the imaging plane is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of" when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

The present disclosure reduces the height of lens assembly in the Y-axis direction by trimming the lens assembly, so as to reduce the height of the lens module, so that the module size can be small enough even when the lens assembly has a large aperture. The lens barrel, the lens flange, and even an optical part of a lens can be trimmed if necessary. In the present disclosure, in order to reduce the height of the lens module, the optical part of some lenses is trimmed, so that a corresponding optical imaging lens assembly is obtained.

To address the above problems, an optical imaging lens assembly is provided in the present disclosure. The optical imaging lens assembly includes, sequentially from an object side to an image side along an optical axis: a first lens, having a refractive power; a second lens, having a refractive power; a third lens, having a refractive power; and at least two subsequent lenses having refractive powers, wherein a distance TTL along the optical axis from an object-side surface of the first lens to an imaging plane of the optical imaging lens assembly and a total effective focal length f of the optical imaging lens assembly satisfy TTL/f<1, and wherein an optical part of at least one of the lenses included in the optical imaging lens assembly is trimmed on a Y-axis, a maximum effective radius DY along the Y-axis of the trimmed lens and a maximum effective radius DX along a X-axis of the trimmed lens satisfy 0.5<DY/DX<1.0, wherein the X-axis is perpendicular to the Y-axis.

Specifically, the optical imaging lens assembly provided in the present disclosure includes at least five lenses, and an optical part of at least one of these lenses has been subjected to a trimming process. FIG. 1 is schematic view of a trimming process performed along the Y-axis for an optical imaging lens assembly according to an embodiment of the present disclosure. As shown in FIG. 1, the portion with dotted line represents the trimmed part, and the portion with solid line is a counter shape of the lens after the trimming process. After the lens is trimmed in the Y-axis direction, the ratio of the maximum effective radius DY along the Y-axis of the trimmed lens with respect to the maximum effective radius DX along the X-axis of the trimmed lens is between 0.5 and 1.0. The difference between the diffraction limits in the X-axis direction and the Y-axis direction are ensured to be not too large to cause uneven image quality, while reducing the height of the optical imaging lens assembly.

According to an implementation of the present disclosure, an optical part of the first lens is trimmed in the Y-axis direction, and a maximum effective radius DT11Y along the Y-axis of the object-side surface of the first lens and a maximum effective radius DT11X along the X-axis of the object-side surface of the first lens satisfy: 0.5<DT11Y/DT11X<1.0. If the first lens affects the overall height of the optical imaging lens assembly, the optical part of the first lens may be trimmed along the Y-axis. Meanwhile, the height in the Y-axis direction can be reduced while achieving a large aperture by controlling the ratio of the maximum effective radius in the Y-axis direction of the object-side surface of the first lens with respect to the maximum effective radius in the X-axis direction of the object-side surface of the first lens to be within an appropriate range. In addition, the difference between the diffraction limits in the X-axis direction and Y-axis direction are ensured to be not too large to cause uneven image quality, while reducing the height of the optical imaging lens assembly.

According to an implementation of the present disclosure, a maximum effective radius DT12Y along the Y-axis of an image-side surface of the first lens and a maximum effective radius DT12X along the X-axis of the image-side surface of the first lens satisfy: 0.5<DT12Y/DT12X<1.0. As described above, in this way, the difference between the diffraction limits in the X-axis direction and Y-axis direction are ensured to be not too large to cause uneven image quality, while reducing the height of the optical imaging lens assembly.

According to an implementation of the present disclosure, a maximum effective radius DT21Y along the Y-axis of an object-side surface of the second lens and a maximum effective radius DT21X along the X-axis of the object-side surface of the second lens satisfy: 0.5<DT21Y/DT21X≤1.0. If the second lens affects the overall height of the optical imaging lens assembly, the optical part of the second lens may be trimmed along the Y-axis. Meanwhile, the height in the Y-axis direction can be reduced while achieving a large aperture by controlling the ratio of the maximum effective radius in the Y-axis direction of the object-side surface of the second lens with respect to the maximum effective radius in the X-axis direction of the object-side surface of the second lens to be within an appropriate range, so that the optical imaging lens assembly can meet the requirements of height dimension of the module and increase the size space of the motor. In addition, the difference between the diffraction limits in the X-axis direction and Y-axis direction are ensured to be not too large to cause uneven image quality, while reducing the height of the optical imaging lens assembly.

According to an implementation of the present disclosure, a maximum effective radius DT22Y along the Y-axis of an image-side surface of the second lens and a maximum effective radius DT22X along the X-axis of the image-side surface of the second lens satisfy: 0.5<DT22Y/DT22X≤1.0. As described above, this is beneficial to realize a large aperture and at the same time reduce the height of the trimmed lens in the Y-axis direction, so that the optical imaging lens assembly can meet the requirements of height dimension of the module and increase the size space of the motor. In addition, the difference between the diffraction limits in the X-axis direction and Y-axis direction are ensured to be not too large to cause uneven image quality, while reducing the height of the optical imaging lens assembly.

According to an implementation of the present disclosure, a radius of curvature R1 of the object-side surface of the first lens and an effective focal length f1 of the first lens satisfy: 0.2<R1/f1<1.0, for example, 0.47<R1/f1<0.71. Properly controlling the ratio of the radius of curvature of the object-side surface of the first lens with respect to the effective focal length of the first lens may control the curvature of the object-side surface of the first lens, reduce the optical sensitivity of the object-side surface of the first lens, and thus better ensure that the system has a larger focal length.

According to an implementation of the present disclosure, a radius of curvature R5 of an object-side surface of the third lens, a radius of curvature R6 of an image-side surface of the third lens and a total effective focal length f of the optical imaging lens assembly satisfy: 0.3<(R5+R6)/f<0.8, for example, 0.47<(R5+R6)/f<0.73. Properly controlling the ratio of the sum of the radius of curvature of the object-side surface and the radius of curvature of the image-side surface of the third lens with respect to the total effective focal length of the optical imaging lens assembly is beneficial to dispose the refractive power of the system reasonably and improve the high resolution performance of the system.

According to an implementation of the present disclosure, a total focal length f of the optical imaging lens assembly and a combined focal length f23 of the second lens and the third lens satisfy: 0.5<f/f23<1.5. Properly controlling the ratio of the total effective focal length of the optical imaging lens assembly with respect to the combined focal length of the second lens and the third lens can effectively avoid excessive concentration of the refractive power, and help to improve the aberration correction ability of the system. At the same time, properly disposition of the refractive power improves the high resolution performance of the system.

According to an implementation of the present disclosure, a radius of curvature R3 of an object-side surface of the second lens and a radius of curvature R4 of an image-side surface of the second lens satisfy: 0.2<(R3+R4)/(R3-R4) <1.3. Controlling the ratio of sum of the radius of curvature R3 of the object-side surface of the second lens and the radius of curvature R4 of the image-side surface of the second lens with respect to the difference between the radius of curvature R3 of the object-side surface of the second lens and the radius of curvature R4 of the image-side surface of the second lens to be within an appropriate range helps to reduce the sensitivity of the system and improve the processability of the lens assembly.

According to an implementation of the present disclosure, the at least two subsequent lenses include a fourth lens at an image side of the third lens and a fifth lens at an image side of the fourth lens, and an air gap T12 along the optical axis between the first lens and the second lens, an air gap T23 along the optical axis between the second lens and the third lens, an air gap T34 along the optical axis between the third lens and the fourth lens and an air gap T45 along the optical axis between the fourth lens and the fifth lens satisfy: 0.1<(T12+T23)/(T34+T45)<0.6, for example, 0.18<(T12+ T23)/(T34+T45)<0.50. Controlling the relationship of the air gaps between two adjacent lenses among the first lens, the second lens, the third lens and the fourth lens to be within an appropriate range is beneficial to achieve a proper size layout for the optical imaging system, realize the reduction in aperture size, and at the same time, improve the high resolution performance of the system.

According to an implementation of the present disclosure, the at least two subsequent lenses include a fourth lens at an image side of the third lens and a fifth lens at an image side of the fourth lens, and a center thickness CT3 along the optical axis of the third lens, a center thickness CT4 along the optical axis of the fourth lens, and a center thickness CT5 along the optical axis of the fifth lens satisfy: 0.2<CT5/ (CT3+CT4)<0.7. Controlling the ratio of the center thickness along the optical axis of the fifth lens with respect to the sum of the center thickness along the optical axis of the third lens and the center thickness along the optical axis of the fourth lens to be within an appropriate range, helps to reduce the size of the system, ensures the processability of the lens assembly and improves the high resolution performance of the system.

According to an implementation of the present disclosure, a projection distance SAG31 along the optical axis from an intersection of an object-side surface of the third lens and the optical axis to an effective radius vertex of the object-side surface of the third lens, and a projection distance SAG32 along the optical axis from an intersection of an image-side surface of the third lens and the optical axis to an effective radius vertex of the image-side surface of the third lens satisfy: 0.3<SAG32/SAG31<0.8. By controlling the ratio of the projection distance SAG32 along the optical axis of the distance from the intersection of the image-side surface of the third lens and the optical axis to the effective radius vertex of the image-side surface of the third lens with respect to the projection distance SAG31 along the optical axis of the distance from the intersection of the object-side surface of the third lens and the optical axis to the effective radius vertex of the object-side surface of the third lens to be within an appropriate range, the optical imaging system has a better aberration correction capability and at the same time, the processing difficulty of the lens assembly is reduced.

According to an implementation of the present disclosure, half of a maximal field-of-view angle of the optical imaging lens assembly is smaller than 25°. Controlling the half of the maximal field-of-view angel of the optical imaging lens assembly to be within an appropriate range allows the system to have a greater relative brightness, ensures the system to have a good telephoto performance, and improves the imaging quality of the system.

According to an implementation of the present disclosure, the refractive power of the first lens may be a positive refractive power, and the object-side surface of the first lens may be a convex surface. In addition, the refractive power of the second lens may be a negative refractive power, and an image-side surface of the second lens may be a concave surface. An object-side surface of the third lens may be a convex surface, and an image-side surface of the third lens may be a concave surface. The refractive power of the fourth lens may be a positive refractive power. Through the above configuration, the light can be better focused onto the imaging plane, the aberration of the system is balanced, and the imaging quality of the system is improved.

According to an aspect of the present disclosure, an electronic device including the above optical imaging lens assembly is provided. The electronic device provided in the present disclosure is equipped with the above optical imaging lens assembly to obtain high-definition captured images.

However, the one skilled in the art will understand that the numbers of lenses constituting the optical imaging lens assembly can be changed to obtain the various results and advantages described in the present disclosure without departing from the technical solutions to be protected herein. For example, although five lenses or six lenses have been described as an example in the implementations, the optical imaging lens assembly is not limited to include five lenses or six lenses. The optical imaging lens assembly may also include other numbers of lenses if desired.

Specific embodiments applicable to the optical imaging lens assembly of the above implementations will be further described below with reference to the accompanying drawings.

Embodiment 1

Figure 2:
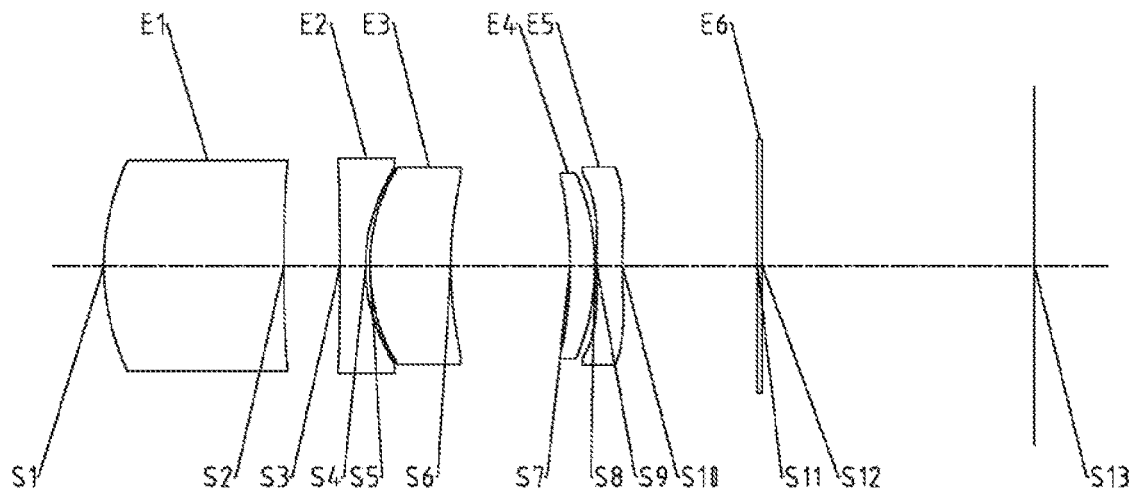
FIG. 2 is a schematic structural view of an optical imaging lens assembly according to embodiment 1 of the present disclosure.

An optical imaging lens assembly according to embodiment 1 of the present disclosure is described below with reference to FIG. 2 to FIG. 3C. FIG. 2 is a schematic structural view of an optical imaging lens assembly according to embodiment 1 of the present disclosure.

As shown in FIG. 2, the optical imaging lens assembly includes, sequentially from an object side to an image side along an optical axis: a first lens E1, a second lens E2, a third lens E3, a fourth lens E4, a fifth lens E5, an optical filter E6 and an imaging plane S13.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 1 is a table illustrating basic parameters of the optical imaging lens assembly of embodiment 1, wherein the units for the radius of curvature, the thickness and focal length are millimeter (mm).

TABLE 1

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5000 | | | |
| S1 | aspheric | 5.8992 | 4.2578 | 1.55 | 56.1 | −0.0594 |
| S2 | aspheric | 57.7950 | 1.3300 | | | −84.0237 |
| S3 | aspheric | −28.0157 | 0.6018 | 1.62 | 25.9 | −95.3232 |
| S4 | aspheric | 4.8587 | 0.1028 | | | 2.3804 |
| S5 | aspheric | 4.6693 | 1.9076 | 1.55 | 56.1 | 0.1416 |
| S6 | aspheric | 8.8176 | 2.8194 | | | −5.4292 |
| S7 | aspheric | −8.8286 | 0.5948 | 1.67 | 20.4 | −68.0791 |
| S8 | aspheric | −5.3901 | 0.0350 | | | 0.1640 |
| S9 | aspheric | 16.6642 | 0.6104 | 1.55 | 56.1 | −5.6290 |
| S10 | aspheric | 8.4752 | 3.1935 | | | −14.8264 |
| S11 | spherical | infinite | 0.1100 | 1.52 | 64.2 | |
| S12 | spherical | infinite | 6.4369 | | | |
| S13 | spherical | infinite | | | | |

In embodiment 1, the object-side surface and the image-side surface of any one of the first lens E1 to the fifth lens E5 are aspheric, and the surface shape x of each aspheric lens can be defined by using, but not limited to, the following aspheric formula:

$$x = \frac{ch^2}{1+\sqrt{1-(k+1)c^2h^2}} + \Sigma\, A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature R in the above Table 1); k is the conic coefficient; $A_i$ is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 in embodiment 1.

Figure 3A:
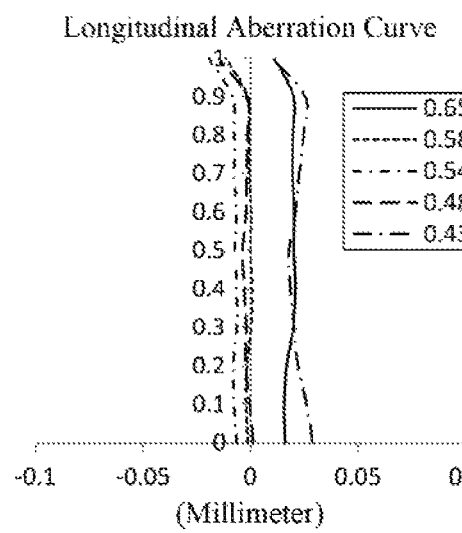
FIGS. 3A to 3C illustrate a longitudinal aberration curve, an astigmatic curve, and a distortion curve of the optical imaging lens assembly according to embodiment 1, respectively.
Figure 3B:
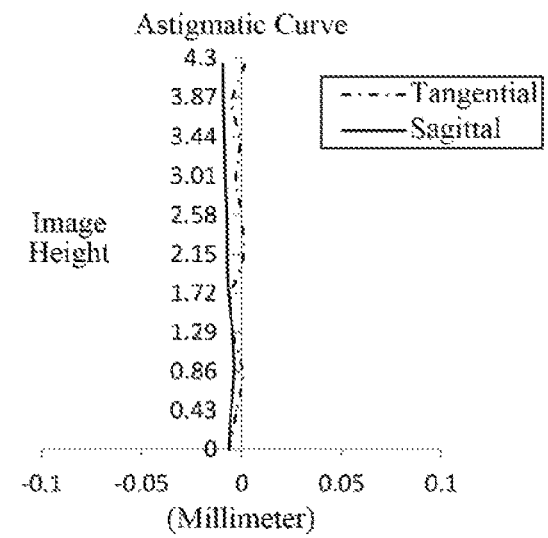
Figure 3C:
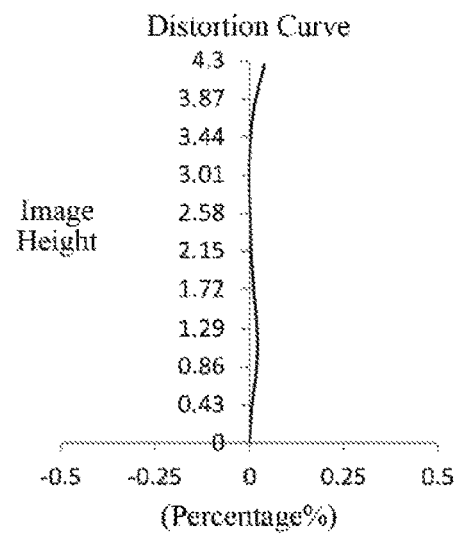

FIG. 3A illustrates a longitudinal aberration curve of the optical imaging lens assembly according to embodiment 1, representing deviations of focal points converged by light of different wavelengths after passing through the optical imaging lens assembly. FIG. 3B illustrates an astigmatic curve of the optical imaging lens assembly according to embodiment 1, representing a curvature of a tangential plane and a curvature of a sagittal plane. FIG. 3C illustrates a distortion curve of the optical imaging lens assembly according to embodiment 1, representing amounts of distortion at different image heights. It can be seen from FIG. 3A to FIG. 3C that the optical imaging lens assembly provided in embodiment 1 can achieve a good image quality.

Embodiment 2

Figure 4:
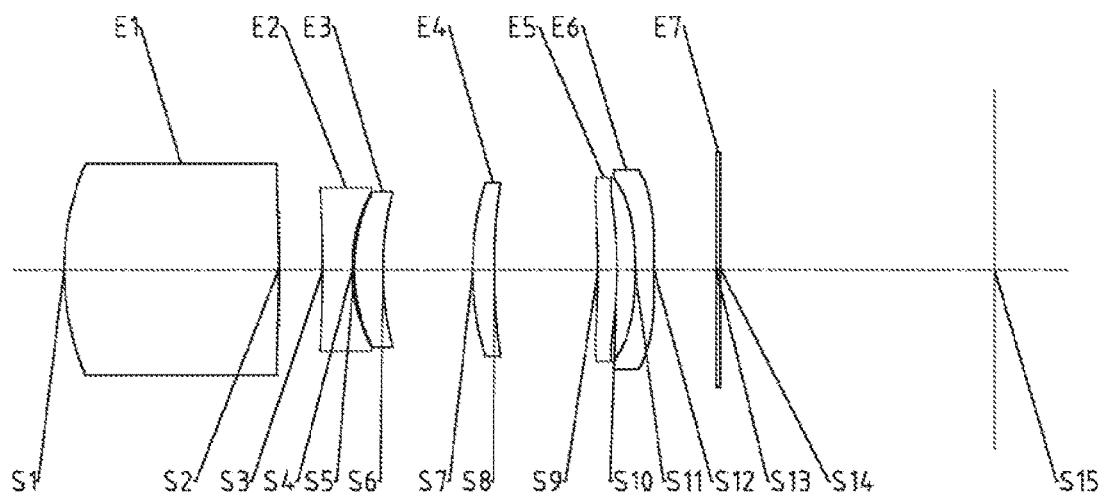
FIG. 4 is a schematic structural view of an optical imaging lens assembly according to embodiment 2 of the present disclosure.

An optical imaging lens assembly according to embodiment 2 of the present disclosure is described below with reference to FIG. 4 to FIG. 5C. FIG. 4 is a schematic structural view of an optical imaging lens assembly according to embodiment 2 of the present disclosure.

TABLE 2

| Surface number | A4 | A6 | A8 | A10 | A12 |
|---|---|---|---|---|---|
| S1 | 2.6322E−02 | 6.1379E−03 | 1.2602E−03 | 2.0692E−04 | 4.4838E−05 |
| S2 | 6.2121E−02 | −3.5102E−04 | 1.4246E−03 | 1.1156E−06 | 3.2142E−05 |
| S3 | 7.3650E−02 | −5.2187E−02 | 1.7225E−02 | −1.1370E−02 | 3.9852E−04 |
| S4 | −2.3390E−02 | −5.2938E−02 | 5.4662E−03 | −2.0990E−03 | −7.9083E−05 |
| S5 | 1.1576E−02 | 4.3849E−03 | 1.7860E−03 | 2.4664E−04 | −6.8699E−05 |
| S6 | 1.2232E−02 | 2.0547E−02 | −4.0935E−03 | −3.8679E−03 | −2.8861E−03 |
| S7 | −1.1955E−01 | −9.6161E−03 | 5.9696E−06 | 2.2518E−05 | 3.5189E−04 |
| S8 | −2.7748E−02 | −4.4020E−02 | −3.8105E−03 | −3.2310E−03 | −7.8868E−04 |
| S9 | −3.9377E−01 | 3.0151E−02 | −4.6876E−03 | 1.0046E−03 | −3.6291E−04 |
| S10 | −3.3006E−01 | 2.8778E−02 | −4.3086E−03 | 7.3396E−04 | −1.4254E−04 |

| Surface number | A14 | A16 | A18 | A20 |
|---|---|---|---|---|
| S1 | 1.1641E−06 | 2.0872E−06 | −1.8371E−06 | 2.6397E−06 |
| S2 | −3.3262E−06 | 4.2437E−06 | −4.1431E−06 | 1.3461E−06 |
| S3 | −3.6227E−04 | 6.0174E−04 | 2.3955E−04 | 1.0799E−04 |
| S4 | −1.5684E−04 | −7.3438E−05 | −4.6817E−05 | −3.8705E−05 |
| S5 | −2.7786E−05 | −5.6384E−05 | −3.2459E−05 | −3.8473E−05 |
| S6 | −1.6680E−03 | −7.9159E−04 | −2.7014E−04 | −5.6599E−05 |
| S7 | 3.0110E−04 | 1.3739E−04 | 7.9068E−05 | 4.2583E−05 |
| S8 | 2.2396E−04 | 2.2604E−04 | 4.5112E−04 | 8.2605E−05 |
| S9 | 1.3140E−04 | −3.3723E−05 | 7.7907E−06 | −1.1058E−06 |
| S10 | 3.1943E−05 | −8.2720E−06 | 1.9147E−06 | −2.1376E−07 |

As shown in FIG. 4, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a concave surface, and an image-side surface S12 is a convex surface. The optical filter E7 has an object-side surface S13 and an image-side surface S14. Light from the object sequentially passes through the respective surfaces S1 to S14 and is finally imaged on the imaging plane S15.

Table 3 is a table illustrating basic parameters of the optical imaging lens assembly of embodiment 2, wherein the units for the radius of curvature, the thickness and focal length are millimeter (mm).

TABLE 3

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5000 | | | |
| S1 | aspheric | 6.4402 | 5.0803 | 1.55 | 56.1 | −0.1242 |
| S2 | aspheric | −28.9937 | 1.0290 | | | −99.0000 |
| S3 | aspheric | −13.7735 | 0.6986 | 1.62 | 25.9 | −82.5250 |
| S4 | aspheric | 4.6096 | 0.0500 | | | 2.1689 |
| S5 | aspheric | 4.3019 | 0.6836 | 1.55 | 56.1 | 0.3487 |
| S6 | aspheric | 7.0944 | 2.1267 | | | −3.5600 |
| S7 | aspheric | 8.0948 | 0.5141 | 1.67 | 20.4 | 2.2290 |
| S8 | aspheric | 17.0385 | 2.4350 | | | 5.0000 |
| S9 | aspheric | −22.4574 | 0.4500 | 1.65 | 23.5 | −98.5401 |
| S10 | aspheric | −10.2443 | 0.4263 | | | −30.2307 |
| S11 | aspheric | −10.8857 | 0.4500 | 1.55 | 56.1 | −71.4323 |
| S12 | aspheric | −256.7479 | 1.4673 | | | 5.0000 |
| S13 | spherical | infinite | 0.1100 | 1.52 | 64.2 | |
| S14 | spherical | infinite | 6.4790 | | | |
| S15 | spherical | infinite | | | | |

In embodiment 2, the object-side surface and the image-side surface of any one of the first lens E1 to the sixth lens E6 are aspheric. Table 4 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S12 in embodiment 2.

TABLE 4

| Surface number | A4 | A6 | A8 | A10 | A12 |
|---|---|---|---|---|---|
| S1 | 3.8195E−05 | 8.9268E−07 | −3.0919E−07 | −1.7955E−08 | 9.2195E−09 |
| S2 | 3.2729E−03 | −5.6731E−04 | −7.9190E−05 | 6.6662E−05 | −1.8017E−05 |
| S3 | 1.9215E−02 | −1.0156E−02 | 2.3970E−03 | −1.4606E−04 | −8.7718E−05 |
| S4 | 2.2626E−02 | −5.0885E−03 | −9.6609E−03 | 1.0578E−02 | −5.5700E−03 |
| S5 | −1.7161E−03 | 6.0474E−03 | −9.2524E−03 | 8.4523E−03 | −4.5266E−03 |
| S6 | −4.7452E−03 | 2.7844E−04 | 3.5978E−03 | −3.0869E−03 | 1.4456E−03 |
| S7 | 1.8587E−03 | −1.7638E−03 | 2.3204E−03 | −1.5692E−03 | 6.5375E−04 |
| S8 | 1.0482E−03 | −1.7047E−03 | 2.4322E−03 | −1.6712E−03 | 7.0587E−04 |
| S9 | −1.4867E−03 | −2.9839E−03 | 2.9293E−03 | −8.2030E−04 | 1.3818E−06 |
| S10 | −9.4592E−04 | −6.0574E−03 | 5.2360E−03 | −1.6774E−03 | 2.0053E−04 |
| S11 | −1.7544E−02 | −4.5913E−03 | 4.1492E−03 | −1.0160E−03 | −1.6536E−04 |
| S12 | −1.2620E−02 | −2.0658E−03 | 2.1470E−03 | −8.1316E−04 | 1.4331E−04 |

| Surface number | A14 | A16 | A18 | A20 |
|---|---|---|---|---|
| S1 | −1.0457E−09 | 5.7892E−11 | −1.6057E−12 | 1.7730E−14 |
| S2 | 2.8251E−06 | −2.6910E−07 | 1.4444E−08 | −3.3546E−10 |
| S3 | 3.0815E−05 | −4.8313E−06 | 3.9127E−07 | −1.3219E−08 |
| S4 | 1.7279E−03 | −3.1824E−04 | 3.2106E−05 | −1.3661E−06 |
| S5 | 1.4460E−03 | −2.7130E−04 | 2.7586E−05 | −1.1722E−06 |
| S6 | −4.2686E−04 | 7.9078E−05 | −8.3731E−06 | 3.8656E−07 |
| S7 | −1.7472E−04 | 2.9187E−05 | −2.7831E−06 | 1.1507E−07 |

TABLE 4-continued

| | | | |
|---|---|---|---|
| S8 | −1.9149E−04 | 3.2507E−05 | −3.1609E−06 | 1.3392E−07 |
| S9 | 5.6063E−05 | −1.3635E−05 | 1.3266E−06 | −4.7121E−08 |
| S10 | 1.7706E−05 | −6.8226E−06 | 5.5091E−07 | −1.1978E−08 |
| S11 | 1.4747E−04 | −3.4579E−05 | 3.7861E−06 | −1.6769E−07 |
| S12 | −5.8268E−06 | −1.9716E−06 | 3.1116E−07 | −1.4133E−08 |

Figure 5A:
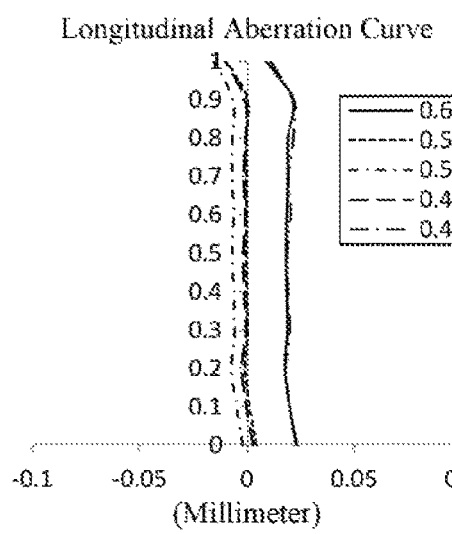
FIGS. 5A to 5C illustrate a longitudinal aberration curve, an astigmatic curve, and a distortion curve of the optical imaging lens assembly according to embodiment 2, respectively.
Figure 5B:
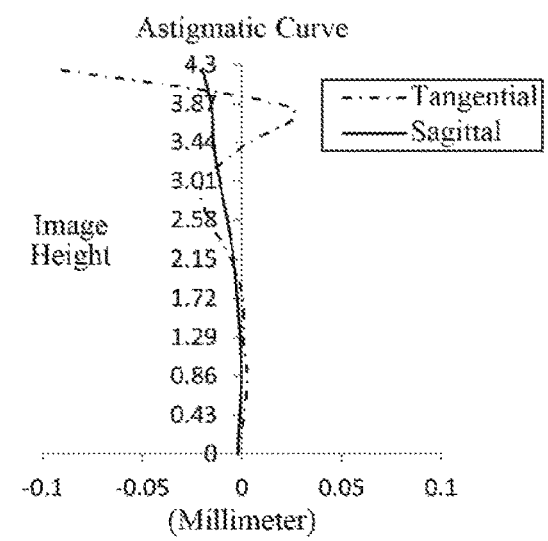
Figure 5C:
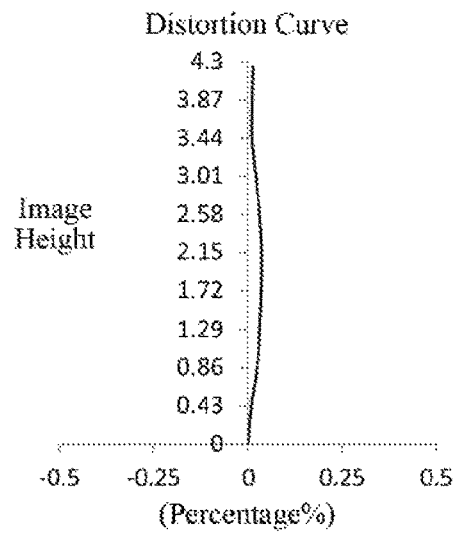

FIG. 5A illustrates a longitudinal aberration curve of the optical imaging lens assembly according to embodiment 2, representing deviations of focal points converged by light of different wavelengths after passing through the optical imaging lens assembly. FIG. 5B illustrates an astigmatic curve of the optical imaging lens assembly according to embodiment 2, representing a curvature of a tangential plane and a curvature of a sagittal plane. FIG. 5C illustrates a distortion curve of the optical imaging lens assembly according to embodiment 2, representing amounts of distortion at different image heights. It can be seen from FIG. 5A to FIG. 5C that the optical imaging lens assembly provided in embodiment 2 can achieve a good image quality.

Embodiment 3

Figure 6:
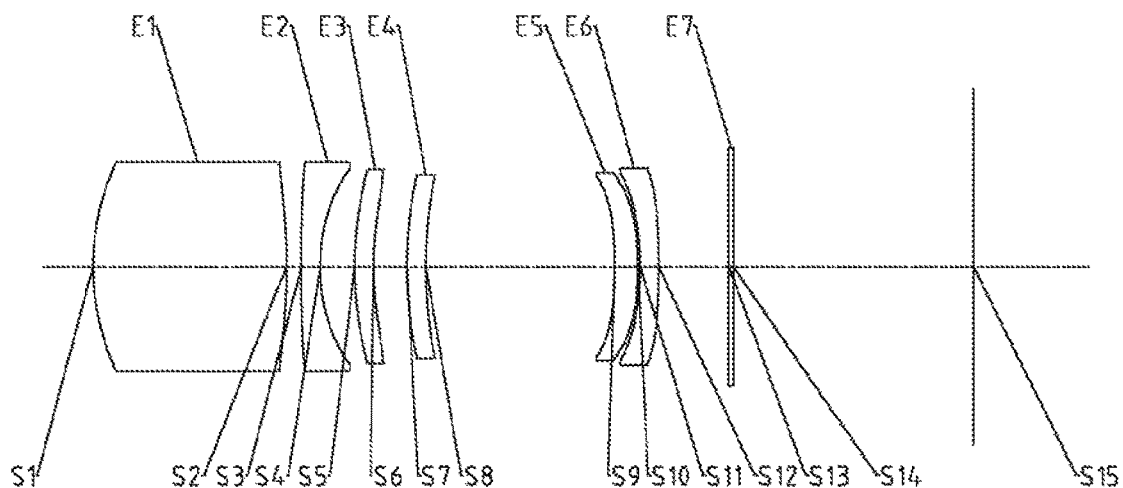
FIG. 6 is a schematic structural view of an optical imaging lens assembly according to embodiment 3 of the present disclosure.

An optical imaging lens assembly according to embodiment 3 of the present disclosure is described below with reference to FIG. 6 to FIG. 7C. FIG. 6 is a schematic structural view of an optical imaging lens assembly according to embodiment 3 of the present disclosure.

As shown in FIG. 6, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, a sixth lens E6, an optical filter E7 and an imaging plane S15.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a convex surface, and an image-side surface S8 thereof is a concave surface. The fifth lens E5 has a positive refractive power, an object-side surface S9 thereof is a concave surface, and an image-side surface S10 thereof is a convex surface. The sixth lens E6 has a negative refractive power, an object-side surface S11 thereof is a concave surface, and an image-side surface S12 is a convex surface. The optical filter E7 has an object-side surface S13 and an image-side surface S14. Light from the object sequentially passes through the respective surfaces S1 to S14 and is finally imaged on the imaging plane S15.

Table 5 is a table illustrating basic parameters of the optical imaging lens assembly of embodiment 3, wherein the units for the radius of curvature, the thickness and focal length are millimeter (mm).

TABLE 5

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5000 | | | |
| S1 | aspheric | 5.8938 | 4.6102 | 1.55 | 56.1 | −0.5803 |
| S2 | aspheric | −14.6342 | 0.3517 | | | 4.9779 |
| S3 | aspheric | 50.3221 | 0.4500 | 1.62 | 25.9 | −78.1868 |
| S4 | aspheric | 4.7540 | 0.8229 | | | −1.3980 |
| S5 | aspheric | 8.7091 | 0.4554 | 1.55 | 56.1 | −18.7801 |
| S6 | aspheric | 7.8235 | 0.7965 | | | −13.4772 |
| S7 | aspheric | 11.1022 | 0.4500 | 1.65 | 23.5 | −3.5122 |
| S8 | aspheric | 11.9522 | 4.4937 | | | 5.0000 |
| S9 | aspheric | −12.6202 | 0.5617 | 1.67 | 20.4 | −7.3282 |
| S10 | aspheric | −6.9149 | 0.0500 | | | 4.6010 |
| S11 | aspheric | −6.9740 | 0.4500 | 1.55 | 56.1 | 4.8992 |
| S12 | aspheric | −19.8065 | 1.6708 | | | −8.1403 |
| S13 | spherical | infinite | 0.1100 | 1.52 | 64.2 | |
| S14 | spherical | infinite | 5.7270 | | | |
| S15 | spherical | infinite | | | | |

In embodiment 3, the object-side surface and the image-side surface of any one of the first lens E1 to the sixth lens E6 are aspheric. Table 6 below shows high-order coefficients $A_4$, $A_6$, $A_8$, $A_{10}$, $A_{12}$ applicable to each aspheric surface S1-S12 in embodiment 3.

TABLE 6

| Surface number | A4 | A6 | A8 | A10 | A12 |
|---|---|---|---|---|---|
| S1 | −8.0905E+02 | −1.0869E+01 | 3.4964E+02 | −2.9534E+02 | 0.0000E+00 |
| S2 | 1.5276E−01 | −1.4502E−03 | −5.2272E−04 | −2.8999E−04 | 0.0000E+00 |
| S3 | 7.7036E−02 | 5.9912E−03 | −5.1896E−03 | −1.5158E−03 | 0.0000E+00 |
| S4 | 1.7513E−01 | 1.1844E−02 | 1.2943E−03 | −4.1316E−05 | 0.0000E+00 |
| S5 | 6.9974E−02 | −2.9816E−02 | −4.2156E−03 | −7.8060E−04 | 0.0000E+00 |
| S6 | −1.0105E−01 | −3.7388E−02 | −5.2685E−03 | −6.4143E−04 | 0.0000E+00 |
| S7 | 3.5026E+03 | 9.5986E+01 | 4.5647E+02 | 3.7152E+01 | 0.0000E+00 |
| S8 | 5.6228E+01 | −2.6219E+01 | 5.4994E+00 | 2.8380E+00 | 0.0000E+00 |
| S9 | −1.4147E−01 | −4.6945E−03 | −3.3261E−04 | 3.6875E−06 | 0.0000E+00 |
| S10 | −1.1406E+00 | 1.6115E−01 | 1.0266E−01 | 1.9893E−02 | 0.0000E+00 |
| S11 | −5.8440E+01 | 4.5286E+00 | 2.5205E+00 | 2.0321E+00 | −2.1490E+00 |
| S12 | −1.7805E−01 | −7.0192E−03 | −9.0894E−04 | −1.4224E−04 | 7.8886E−07 |

Figure 7A:
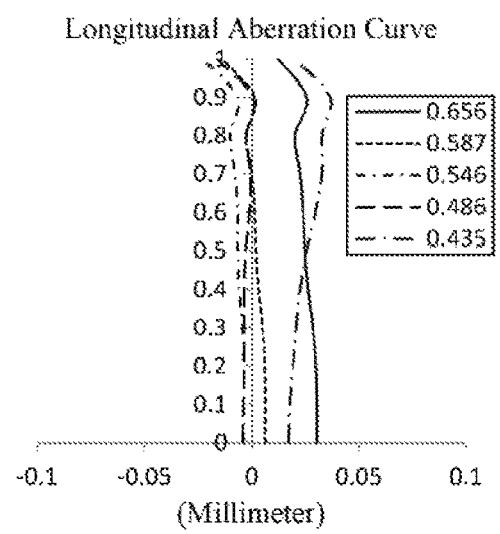
FIGS. 7A to 7C illustrate a longitudinal aberration curve, an astigmatic curve, and a distortion curve of the optical imaging lens assembly according to embodiment 3, respectively.
Figure 7B:
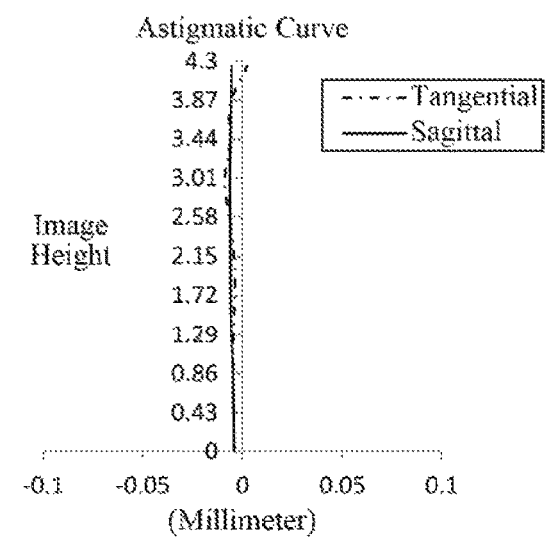
Figure 7C:
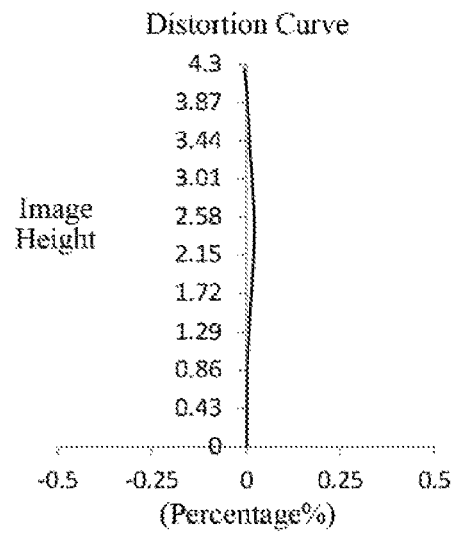

FIG. 7A illustrates a longitudinal aberration curve of the optical imaging lens assembly according to embodiment 3, representing deviations of focal points converged by light of different wavelengths after passing through the optical imaging lens assembly. FIG. 7B illustrates an astigmatic curve of the optical imaging lens assembly according to embodiment 3, representing a curvature of a tangential plane and a curvature of a sagittal plane. FIG. 7C illustrates a distortion curve of the optical imaging lens assembly according to embodiment 3, representing amounts of distortion at different image heights. It can be seen from FIG. 7A to FIG. 7C that the optical imaging lens assembly provided in embodiment 3 can achieve a good image quality.

Embodiment 4

Figure 8:
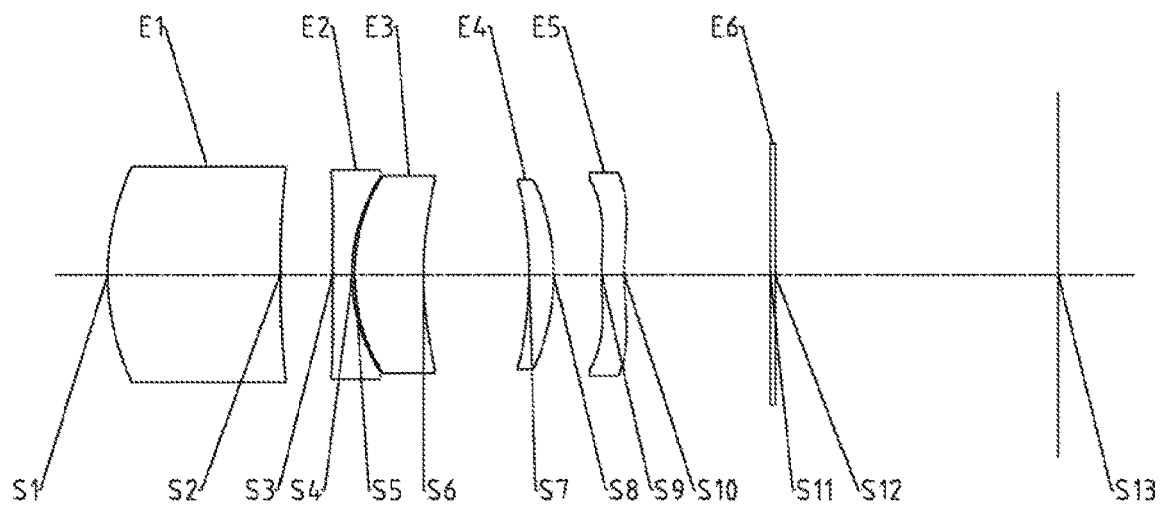
FIG. 8 is a schematic structural view of an optical imaging lens assembly according to embodiment 4 of the present disclosure.

An optical imaging lens assembly according to embodiment 4 of the present disclosure is described below with reference to FIG. 8 to FIG. 9C. FIG. 8 is a schematic structural view of an optical imaging lens assembly according to embodiment 4 of the present disclosure.

As shown in FIG. 8, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a concave surface. The third lens E3 has a positive refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a convex surface, and an image-side surface S10 thereof is a concave surface. The optical filter E6 has an object-side surface S11 and an image-side surface S12. Light from the object sequentially passes through the respective surfaces S1 to S12 and is finally imaged on the imaging plane S13.

Table 7 is a table illustrating basic parameters of the optical imaging lens assembly of embodiment 4, wherein the units for the radius of curvature, the thickness and focal length are millimeter (mm).

TABLE 7

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5000 | | | |
| S1 | aspheric | 5.8784 | 3.9999 | 1.55 | 56.1 | −0.0405 |
| S2 | aspheric | 33.3081 | 1.2056 | | | −99.0000 |
| S3 | aspheric | −42.1018 | 0.4500 | 1.62 | 25.9 | 5.0000 |
| S4 | aspheric | 4.8857 | 0.0557 | | | 2.3097 |
| S5 | aspheric | 4.4093 | 1.5955 | 1.55 | 56.1 | 0.1147 |
| S6 | aspheric | 8.0207 | 2.4503 | | | −5.5738 |
| S7 | aspheric | −8.9068 | 0.5716 | 1.67 | 20.4 | −47.7936 |
| S8 | aspheric | −5.5076 | 1.0919 | | | 0.6164 |
| S9 | aspheric | 9.7790 | 0.5277 | 1.55 | 56.1 | −10.4202 |
| S10 | aspheric | 6.2614 | 3.3920 | | | −13.7516 |
| S11 | spherical | infinite | 0.1100 | 1.52 | 64.2 | |
| S12 | spherical | infinite | 6.5498 | | | |
| S13 | spherical | infinite | | | | |

In embodiment 4, the object-side surface and the image-side surface of any one of the first lens E1 to the fifth lens E5 are aspheric. Table 8 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 in embodiment 4.

TABLE 8

| Surface number | A4 | A6 | A8 | A10 | A12 |
|---|---|---|---|---|---|
| S1 | 3.0222E−02 | 5.9454E−03 | 1.2314E−03 | 1.9076E−04 | 5.6295E−05 |
| S2 | 5.6453E−02 | −2.1239E−03 | 1.9432E−03 | −1.1668E−04 | 9.7219E−05 |
| S3 | 4.3545E−02 | −4.8402E−02 | 1.8639E−02 | −1.0213E−02 | −9.9886E−06 |
| S4 | −2.3208E−03 | −5.3623E−02 | 9.0171E−03 | −3.3628E−03 | 7.8130E−04 |
| S5 | 1.0693E−02 | 2.0045E−03 | 2.8363E−03 | −5.2665E−05 | 3.0629E−04 |
| S6 | 1.0629E−02 | 1.8540E−02 | −1.9517E−03 | −1.8503E−03 | −2.3308E−03 |
| S7 | −1.3282E−01 | −6.5555E−03 | −4.8477E−03 | 9.3860E−04 | −1.1531E−04 |
| S8 | −5.3621E−02 | −3.1816E−02 | −5.8246E−03 | 1.3219E−03 | −9.2080E−04 |
| S9 | −4.0342E−01 | 2.4584E−02 | −3.6835E−03 | 5.8263E−04 | −1.1296E−04 |
| S10 | −3.3950E−01 | 2.5117E−02 | −3.6569E−03 | 6.1428E−04 | −1.2200E−04 |

| Surface number | A14 | A16 | A18 | A20 |
|---|---|---|---|---|
| S1 | 3.7163E−06 | 1.8131E−06 | −2.4412E−06 | 6.5466E−07 |
| S2 | −1.3509E−05 | 2.2477E−06 | −1.8587E−06 | −1.7784E−07 |
| S3 | −1.8155E−03 | −8.5460E−05 | −1.8072E−04 | −6.6102E−07 |
| S4 | −3.0603E−04 | −5.9536E−05 | 1.4926E−05 | −3.4584E−05 |
| S5 | −1.0411E−04 | −1.0082E−04 | 1.0638E−05 | −4.0933E−05 |
| S6 | −1.5707E−03 | −8.7967E−04 | −2.9678E−04 | −5.3251E−05 |
| S7 | 2.0115E−04 | 1.0128E−05 | 2.5978E−06 | −1.2035E−05 |
| S8 | −6.9003E−04 | −7.7481E−04 | −3.3781E−04 | −1.0015E−04 |
| S9 | 2.3396E−05 | −6.2558E−06 | 1.6672E−06 | −1.2794E−07 |
| S10 | 2.6551E−05 | −6.4354E−06 | 1.3663E−06 | −1.3428E−07 |

Figure 9A:
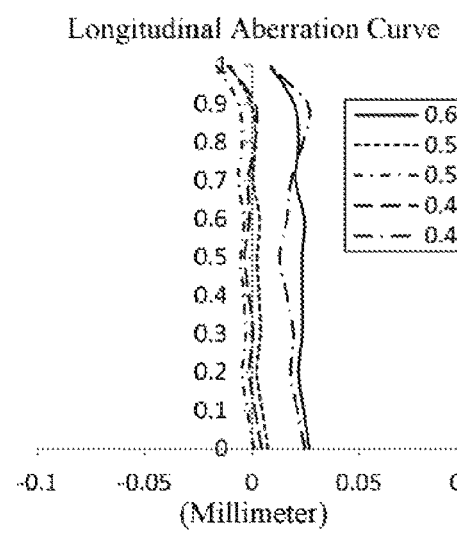
FIGS. 9A to 9C illustrate a longitudinal aberration curve, an astigmatic curve, and a distortion curve of the optical imaging lens assembly according to embodiment 4, respectively.
Figure 9B:
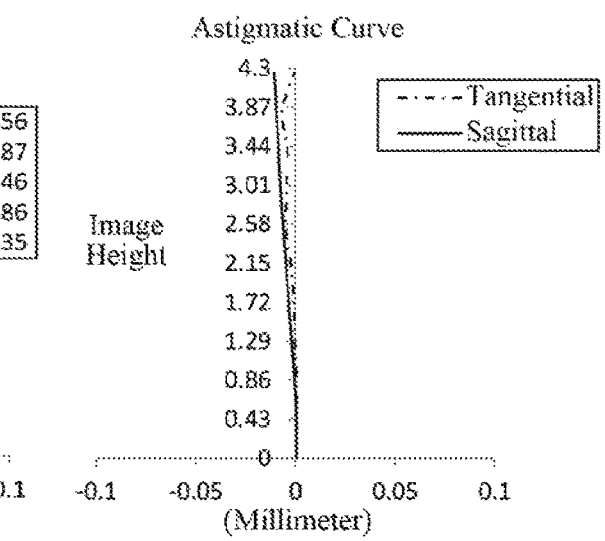
Figure 9C:

FIG. 9A illustrates a longitudinal aberration curve of the optical imaging lens assembly according to embodiment 4, representing deviations of focal points converged by light of different wavelengths after passing through the optical imaging lens assembly. FIG. 9B illustrates an astigmatic curve of the optical imaging lens assembly according to embodiment 4, representing a curvature of a tangential plane and a curvature of a sagittal plane. FIG. 9C illustrates a distortion curve of the optical imaging lens assembly according to embodiment 4, representing amounts of distortion at different image heights. It can be seen from FIG. 9A to FIG. 9C that the optical imaging lens assembly provided in embodiment 4 can achieve a good image quality.

Embodiment 5

Figure 10:
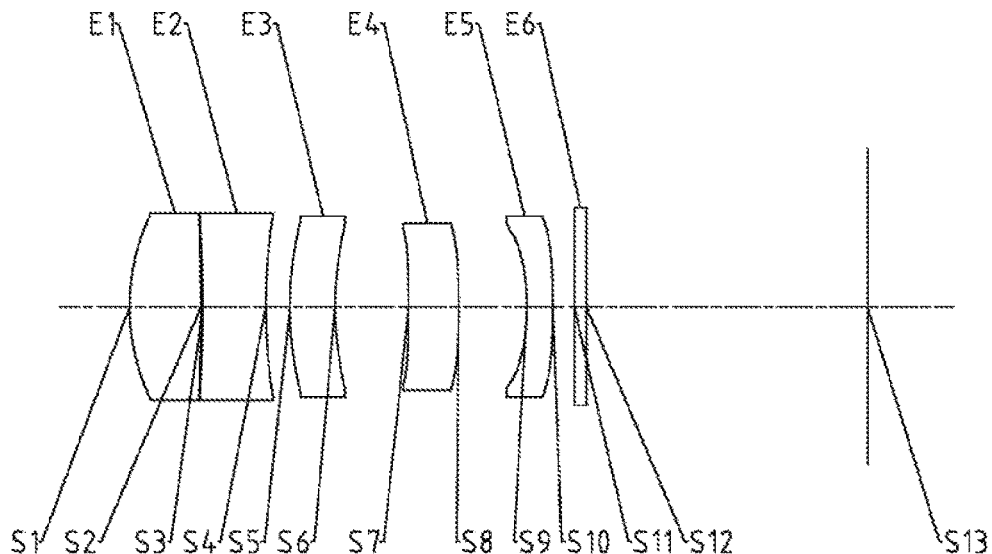
FIG. 10 is a schematic structural view of an optical imaging lens assembly according to embodiment 5 of the present disclosure.

An optical imaging lens assembly according to embodiment 5 of the present disclosure is described below with reference to FIG. 10 to FIG. 11C. FIG. 10 is a schematic structural view of an optical imaging lens assembly according to embodiment 5 of the present disclosure.

As shown in FIG. 10, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has a positive refractive power, an object-side surface S1 thereof is a convex surface, and an image-side surface S2 thereof is a convex surface. The second lens E2 has a negative refractive power, an object-side surface S3 thereof is a concave surface, and an image-side surface S4 thereof is a concave surface. The third lens E3 has a negative refractive power, an object-side surface S5 thereof is a convex surface, and an image-side surface S6 thereof is a concave surface. The fourth lens E4 has a positive refractive power, an object-side surface S7 thereof is a concave surface, and an image-side surface S8 thereof is a convex surface. The fifth lens E5 has a negative refractive power, an object-side surface S9 thereof is a concave surface, and an image-side surface S10 thereof is a convex surface. The optical filter E6 has an object-side surface S11 and an image-side surface S12. Light from the object sequentially passes through the respective surfaces S1 to S12 and is finally imaged on the imaging plane S13.

Table 9 is a table illustrating basic parameters of the optical imaging lens assembly of embodiment 5, wherein the units for the radius of curvature, the thickness and focal length are millimeter (mm).

TABLE 9

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.6093 | | | |
| S1 | aspheric | 3.6045 | 1.2303 | 1.55 | 56.1 | −0.1382 |
| S2 | aspheric | −32.4787 | 0.0300 | | | 5.0000 |
| S3 | aspheric | −19.7486 | 1.0874 | 1.62 | 25.9 | −30.2697 |
| S4 | aspheric | 10.8928 | 0.4038 | | | −43.9833 |
| S5 | aspheric | 5.5938 | 0.7754 | 1.55 | 56.1 | 1.8975 |
| S6 | aspheric | 4.9905 | 1.2663 | | | −0.8920 |

TABLE 9-continued

| Surface number | Surface type | Radius of curvature | Thickness | Material Refractive index | Abbe number | Conic coefficient |
|---|---|---|---|---|---|---|
| S7 | aspheric | −23.8109 | 0.8685 | 1.67 | 20.4 | 5.0000 |
| S8 | aspheric | −11.8561 | 1.1685 | | | 4.9745 |
| S9 | aspheric | −4.6959 | 0.4500 | 1.55 | 64.2 | −78.3824 |
| S10 | aspheric | −21.5459 | 0.3575 | | | −18.4125 |
| S11 | spherical | infinite | 0.2100 | 1.52 | 64.2 | |
| S12 | spherical | infinite | 4.8323 | | | |
| S13 | spherical | infinite | | | | |

In embodiment 5, the object-side surface and the image-side surface of any one of the first lens E1 to the fifth lens E5 are aspheric. Table 10 below shows high-order coefficients $A_4, A_6, A_8, A_{10}, A_{12}, A_{14}, A_{16}, A_{18}$ and $A_{20}$ applicable to each aspheric surface S1-S10 in embodiment 5.

TABLE 10

| Surface number | A4 | A6 | A8 | A10 | A12 |
|---|---|---|---|---|---|
| S1 | −2.0888E−02 | −1.0023E−03 | −2.2341E−04 | 9.4146E−06 | 6.3870E−05 |
| S2 | 5.0300E−03 | 2.6984E−03 | −3.2546E−04 | 5.6920E−04 | −1.9491E−04 |
| S3 | 3.4522E−02 | −2.8404E−03 | −2.3263E−04 | 4.6872E−05 | −2.1674E−04 |
| S4 | 5.2197E−02 | −4.9921E−03 | −9.8472E−04 | −5.8263E−04 | −5.3584E−04 |
| S5 | −4.8572E−02 | 5.8706E−03 | −8.9067E−04 | 5.3201E−05 | −4.6412E−04 |
| S6 | −3.9286E−02 | 9.2962E−04 | −4.9212E−05 | 3.0904E−04 | −1.0230E−04 |
| S7 | −6.6526E−02 | −9.1109E−03 | 5.1231E−04 | 5.7761E−04 | 1.7732E−04 |
| S8 | −6.1502E−02 | −1.0137E−02 | 1.2319E−03 | 6.2194E−04 | 1.6138E−04 |
| S9 | −2.8164E−01 | 1.1686E−02 | −3.8012E−03 | 1.8774E−03 | −2.7125E−04 |
| S10 | −1.4392E−01 | 2.1207E−03 | 7.4000E−04 | 2.1686E−04 | −3.5293E−05 |

| Surface number | A14 | A16 | A18 | A20 |
|---|---|---|---|---|
| S1 | 3.8702E−05 | 1.7802E−05 | 1.8172E−06 | 7.8349E−07 |
| S2 | −1.2414E−04 | −2.1714E−04 | 1.4920E−05 | 5.9840E−05 |
| S3 | 7.6204E−05 | −7.1254E−05 | −2.9637E−05 | 9.7356E−06 |
| S4 | 6.5583E−05 | 3.7810E−05 | 2.0992E−05 | −4.2705E−07 |
| S5 | 1.6029E−04 | 8.9633E−05 | 3.5582E−05 | 2.8682E−06 |
| S6 | 2.1376E−05 | 1.5700E−05 | 7.9932E−06 | 5.1194E−07 |
| S7 | 8.1956E−05 | 2.6925E−05 | 5.0480E−06 | 9.9514E−07 |
| S8 | 8.2925E−05 | 2.6264E−05 | 5.5674E−06 | 1.7975E−06 |
| S9 | 1.9021E−04 | −6.3927E−05 | −3.3809E−06 | −2.1023E−05 |
| S10 | −3.5788E−05 | −5.5638E−05 | −3.4440E−05 | −1.7884E−05 |

Figure 11A:
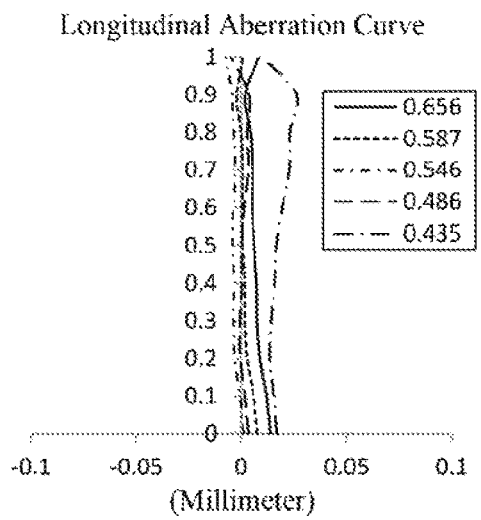
FIGS. 11A to 11C illustrate a longitudinal aberration curve, an astigmatic curve, and a distortion curve of the optical imaging lens assembly according to embodiment 5, respectively.
Figure 11B:
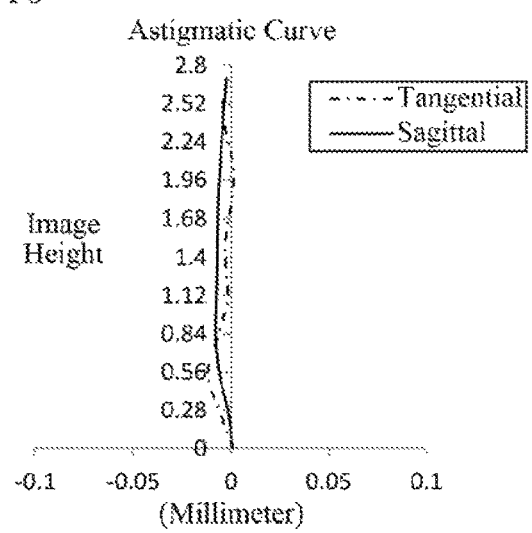
Figure 11C:
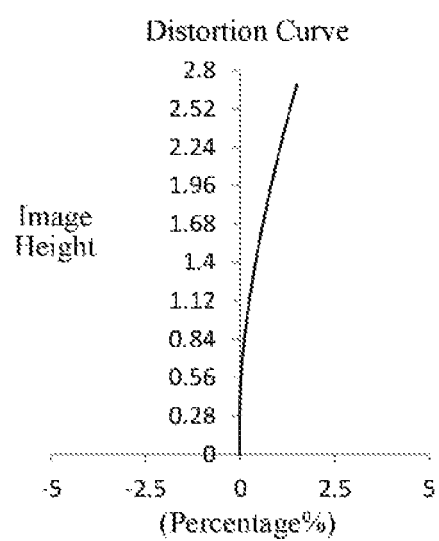

FIG. 11A illustrates a longitudinal aberration curve of the optical imaging lens assembly according to embodiment 5, representing deviations of focal points converged by light of different wavelengths after passing through the optical imaging lens assembly. FIG. 11B illustrates an astigmatic curve of the optical imaging lens assembly according to embodiment 5, representing a curvature of a tangential plane and a curvature of a sagittal plane. FIG. 11C illustrates a distortion curve of the optical imaging lens assembly according to embodiment 5, representing amounts of distortion at different image heights. It can be seen from FIG. 11A to FIG. 11C that the optical imaging lens assembly provided in embodiment 5 can achieve a good image quality.

Table 11 below shows effective focal lengths f1 to f6 of respective lens, the total effective focal length f of the optical imaging lens assembly, a total length TTL of the optical imaging lens assembly, and half of the diagonal length ImgH of an effective pixel area on the imaging plane, aperture value f/EPD of the optical imaging lens assembly, and half of a maximal field-of-view angle Semi-FOV of the optical imaging lens assembly in the above-mentioned embodiments 1 to 5.

TABLE 11

| Basic parameters/ Embodiments | 1 | 2 | 3 | 4 | 5 |
|---|---|---|---|---|---|
| f1 (mm) | 11.68 | 10.16 | 8.35 | 12.42 | 6.02 |
| f2 (mm) | −6.63 | −5.49 | −8.49 | −7.03 | −10.74 |
| f3 (mm) | 15.62 | 18.41 | −172.07 | 15.50 | −155.17 |
| f4 (mm) | 19.35 | 22.53 | 200.04 | 20.21 | 34.43 |
| f5 (mm) | −32.41 | 28.74 | 22.00 | −33.64 | −11.1046303 |
| f6 (mm) | / | −20.82 | −19.95 | / | / |
| f (mm) | 23.99 | 24.00 | 24.00 | 24.00 | 14.45 |
| TTL (mm) | 22.00 | 22.00 | 21.00 | 22.00 | 12.68 |
| ImgH (mm) | 4.25 | 4.25 | 4.25 | 4.25 | 2.70 |
| f/EPD | 3.12 | 3.12 | 3.12 | 3.12 | 3.47 |
| Smei-FOV (°) | 10.0 | 10.0 | 10.0 | 10.0 | 10.4 |

Table 12 below shows the relevant parameters of the optical imaging lens assembly in each embodiment of the present disclosure.

TABLE 12

| Formula/Embodiment | 1 | 2 | 3 | 4 | 5 |
|---|---|---|---|---|---|
| TTL/f | 0.92 | 0.92 | 0.88 | 0.92 | 0.88 |
| DT11Y/DT11X | 0.65 | 0.83 | 0.67 | 0.71 | 0.80 |
| DT12Y/DT12X | 0.65 | 0.83 | 0.67 | 0.83 | 0.81 |
| DT21Y/DT21X | 1.00 | 1.00 | 0.93 | 1.00 | 0.86 |
| DT22Y/DT22X | 1.00 | 1.00 | 0.93 | 1.00 | 0.98 |
| R1/f1 | 0.50 | 0.63 | 0.71 | 0.47 | 0.60 |
| (R5 + R6)/f | 0.56 | 0.47 | 0.69 | 0.52 | 0.73 |
| f/f23 | 0.64 | 0.73 | 1.07 | 0.61 | 1.13 |
| (R3 + R4)/(R3 − R4) | 0.70 | 0.50 | 1.21 | 0.79 | 0.29 |
| (T12 + T23)/(T34 + T45) | 0.50 | 0.24 | 0.22 | 0.36 | 0.18 |
| CT5/(CT3 + CT4) | 0.24 | 0.38 | 0.62 | 0.24 | 0.27 |
| SAG32/SAG31 | 0.37 | 0.53 | 0.78 | 0.45 | 0.78 |

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly comprising, sequentially from an object side to an image side of the optical imaging lens assembly along an optical axis:

a first lens, having a refractive power;

a second lens, having a refractive power;

a third lens, having a refractive power; and at least two subsequent lenses, each having a refractive power, wherein a distance TTL along the optical axis from an object-side surface of the first lens to an imaging plane of the optical imaging lens assembly and a total effective focal length f of the optical imaging lens assembly satisfy TTL/f<1, and wherein an optical part of at least one of the lenses comprised in the optical imaging lens assembly is trimmed in a direction of a Y-axis, and a maximum effective radius DY along the Y-axis of the trimmed lens and a maximum effective radius DX along an X-axis of the trimmed lens satisfy 0.5<DY/DX<1.0, wherein the X-axis is perpendicular to the Y-axis, wherein a total focal length f of the optical imaging lens assembly and a combined focal length f23 of the second lens and the third lens satisfy: 0.5<f/f23<1.5.

2. The optical imaging lens assembly according to claim 1, wherein an optical part of the first lens is trimmed in the direction of the Y-axis, and a maximum effective radius DT11Y along the Y-axis of the object-side surface of the first lens and a maximum effective radius DT11X along the X-axis of the object-side surface of the first lens satisfy: 0.5<DT11Y/DT11X<1.0.

3. The optical imaging lens assembly according to claim 2, wherein a maximum effective radius DT12Y along the Y-axis of an image-side surface of the first lens and a maximum effective radius DT12X along the X-axis of the image-side surface of the first lens satisfy: 0.5<DT12Y/DT12X<1.0.

4. The optical imaging lens assembly according to claim 1, wherein an optical part of the second lens is trimmed in the direction of the Y-axis, and a maximum effective radius DT21Y along the Y-axis of an object-side surface of the second lens and a maximum effective radius DT21X along the X-axis of the object-side surface of the second lens satisfy: 0.5<DT21Y/DT21X≤1.0.

5. The optical imaging lens assembly according to claim 4, wherein a maximum effective radius DT22Y along the Y-axis of an image-side surface of the second lens and a maximum effective radius DT22X along the X-axis of the image-side surface of the second lens satisfy: 0.5<DT22Y/DT22X≤1.0.

6. The optical imaging lens assembly according to claim 1, wherein a radius of curvature R1 of the object-side surface of the first lens and an effective focal length f1 of the first lens satisfy: 0.2<R1/f1<1.0.

7. The optical imaging lens assembly according to claim 6, wherein a radius of curvature R5 of an object-side surface of the third lens, a radius of curvature R6 of an image-side surface of the third lens and a total effective focal length f of the optical imaging lens assembly satisfy: 0.3<(R5+R6)/f<0.8.

8. The optical imaging lens assembly according to claim 1, wherein a radius of curvature R3 of an object-side surface of the second lens and a radius of curvature R4 of an image-side surface of the second lens satisfy: 0.2<(R3+R4)/(R3-R4)<1.3.

9. The optical imaging lens assembly according to claim 1, wherein the at least two subsequent lenses comprise a fourth lens at an image side of the third lens and a fifth lens at an image side of the fourth lens, and an air gap T12 along the optical axis between the first lens and the second lens, an air gap T23 along the optical axis between the second lens and the third lens, an air gap T34 along the optical axis between the third lens and the fourth lens and an air gap T45 along the optical axis between the fourth lens and the fifth lens satisfy: 0.1<(T12+T23)/(T34+T45)<0.6.

10. The optical imaging lens assembly according to claim 1, wherein the at least two subsequent lenses comprise a fourth lens at an image side of the third lens and a fifth lens at an image side of the fourth lens, and a center thickness CT3 along the optical axis of the third lens, a center thickness CT4 along the optical axis of the fourth lens, and a center thickness CT5 along the optical axis of the fifth lens satisfy: 0.2<CT5/(CT3+CT4)<0.7.

11. The optical imaging lens assembly according to claim 1, wherein half of a maximal field-of-view angle of the optical imaging lens assembly is smaller than 25°.

12. The optical imaging lens assembly according to claim 1, wherein the first lens has a positive refractive power, and the object-side surface of the first lens is a convex surface.

13. The optical imaging lens assembly according to claim 1, wherein the second lens has a negative refractive power, and an image-side surface of the second lens is a concave surface.

14. The optical imaging lens assembly according to claim 1, wherein an object-side surface of the third lens is a convex surface, and an image-side surface of the third lens is a concave surface.

15. The optical imaging lens assembly according to claim 1, wherein the at least two subsequent lenses comprise a fourth lens at an image side of the third lens, and a refractive power of the fourth lens is a positive refractive power.

16. An electronic device comprising the optical imaging lens assembly according to claim 1.

17. An optical imaging lens assembly comprising, sequentially from an object side to an image side of the optical imaging lens assembly along an optical axis:

a first lens, having a refractive power;
a second lens, having a refractive power;
a third lens, having a refractive power; and
at least two subsequent lenses, each having a refractive power,
wherein a distance TTL along the optical axis from an object-side surface of the first lens to an imaging plane of the optical imaging lens assembly and a total effective focal length f of the optical imaging lens assembly satisfy TTL/f<1, and wherein an optical part of at least one of the lenses comprised in the optical imaging lens assembly is trimmed in a direction of a Y-axis, and a maximum effective radius DY along the Y-axis of the trimmed lens and a maximum effective radius DX along an X-axis of the trimmed lens satisfy 0.5<DY/DX<1.0, wherein the X-axis is perpendicular to the Y-axis, wherein a projection distance SAG31 along the optical axis from an intersection of an object-side surface of the third lens and the optical axis to an effective radius vertex of the object-side surface of the third lens, and a projection distance SAG32 along the optical axis from an intersection of an image-side surface of the third lens and the optical axis to an effective radius vertex of the image-side surface of the third lens satisfy: 0.3<SAG32/SAG31<0.8.

\* \* \* \* \*